United States Patent
Barbas et al.

(10) Patent No.: US 10,592,471 B2
(45) Date of Patent: Mar. 17, 2020

(54) PROCESSING DATABASE STATEMENTS FOR A RELATIONAL DATABASE

(71) Applicant: International Business Machines Corporation, Armonk, NY (US)

(72) Inventors: Pedro M. Barbas, Dunboyne (IE); Joseph Duffy, Dublin (IE); Lei Pan, Dublin (IE); David M. Tilson, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 14/948,847

(22) Filed: Nov. 23, 2015

(65) Prior Publication Data
US 2017/0147592 A1 May 25, 2017

(51) Int. Cl.
*G06F 16/2455* (2019.01)
*G06F 16/16* (2019.01)

(52) U.S. Cl.
CPC ...... *G06F 16/162* (2019.01); *G06F 16/24564* (2019.01)

(58) Field of Classification Search
CPC ......... G06F 17/30117; G06F 17/30477; G06F 16/162; G06F 16/20; G06F 16/24; G06F 16/24524; G06F 16/24561; G06F 16/24564; G06F 16/24565
See application file for complete search history.

(56) References Cited

U.S. PATENT DOCUMENTS

| 7,685,194 | B2 | 3/2010 | Kabra et al. | |
|---|---|---|---|---|
| 2003/0014394 | A1* | 1/2003 | Fujiwara | G06F 17/30595 |
| 2004/0139043 | A1* | 7/2004 | Lei | G06F 21/6227 |
| 2005/0144176 | A1* | 6/2005 | Lei | G06F 21/6227 |
| 2007/0112736 | A1* | 5/2007 | Okamoto | G06F 17/3046 |

(Continued)

FOREIGN PATENT DOCUMENTS

WO 2005103879 A2 11/2005

OTHER PUBLICATIONS

Opyrchal et al.; "Bouncer: policy-based fine grained access control in large databases", SERSC International Journal of Security and Its Applications, vol. 5, No. 2, Apr. 2011. Tasmania, Australia. pp. 1-16.

(Continued)

*Primary Examiner* — James E Richardson
(74) *Attorney, Agent, or Firm* — Mollborn Patents, Inc.; Fredrik Mollborn

(57) ABSTRACT

A computer-implemented method of a database statement for a relational database. The database comprises one or more tables comprising one or more data rows. A database statement is received. A set of predicates from the database statement and a set of data rows from the tables to use to generate the result of the database statement are determined. A set of interdiction statements applicable to one or more data rows is obtained. For each predicate, a set of masks applicable to one or more data rows is obtained, where for each mask, the data masked by the mask is used by the predicate. It is determined if a data row has an applicable interdiction statement, and contains data masked by a mask. If so, the result of the database statement without using the result of applying the predicate to the data row.

16 Claims, 7 Drawing Sheets

(56) References Cited

U.S. PATENT DOCUMENTS

| | | | |
|---|---|---|---|
| 2012/0197919 A1* | 8/2012 | Chen | G06F 17/30 |
| | | | 707/757 |
| 2012/0233148 A1* | 9/2012 | Chen | G06F 21/604 |
| | | | 707/717 |
| 2013/0086088 A1* | 4/2013 | Alton | G06F 17/30477 |
| | | | 707/754 |
| 2014/0052749 A1 | 2/2014 | Rissanen | |
| 2015/0143525 A1 | 5/2015 | Naldurg et al. | |

OTHER PUBLICATIONS

Rizvi et al; "Extending query rewriting techniques for finegrained access control"; SIGMOD Jun. 13-18 2004, 2004, Paris, France; 12 pp.

Halder et al; "Observation-based fine grained access control for relational databases," ICSOFT (1), 2010, pp. 254-265.

Shi et al; "Analyzing and controlling information inference of fine-grained access control policies in relational databases"; 2013 Fourth International Conference on Emerging Intelligent Data and Web Technologies; Xi'an, China; Sep. 9-11, 2013; pp. 385-392.

\* cited by examiner

PROCESSING DATABASE STATEMENTS FOR A RELATIONAL DATABASE

BACKGROUND

The present invention relates to processing database statements for a relational database.

It is common for database systems to utilise fine-grained access control (FGAC) mechanisms, to control access to data by users. FGAC can be used to limit user access to a specific set of rows in a relational table, for example. This level of access control is desirable for all areas of relational data access such as utilities, but is particularly desirable for data manipulation language (DML) SQL statements such as SELECT, INSERT, UPDATE and DELETE.

Traditional methods of implementing FGAC within relational databases systems have relied upon the use of views. For example, "virtual private databases", such as the Oracle virtual private database, allow access to be defined at the row and/or column level. Other known implementations of FGAC use context attributes of a user session to modify SQL queries by adding a predicate into the query.

However, known prior art solutions do not address security issues that can arise due to inference, i.e. where a user can infer information about data stored in a database which they are not permitted access to, using other information which they are permitted to access.

To give an example, suppose a database table contains customer credit card information, with a table CUSTOMERS having columns name, card_number, exp_date and start_date, and containing the following rows:

| name | card_number | exp_date | start_date |
| --- | --- | --- | --- |
| Smith, John | 1234-5678-9012-3456 | 2020 Jan. 1 | 2010 Jan. 1 |
| Doe, Jane | 9876-5432-1098-7654 | 2019 Jun. 10 | 2011 Jun. 10 |
| Bloggs, Joe | 1357-2468-9135-0246 | 2018 Dec. 25 | 2009 Mar. 4 |
| Mustermann, Max | 6284-9681-2833-5503 | 2025 Apr. 4 | 2014 Oct. 11 |

As part of an FGAC mechanism, a mask on the card_number column may be defined, so that particular users are not able to see they whole value for that column. For example, a column mask of the form XXXX-XXXX-XXXX-#### may be defined, so that for example the query:

```
SELECT name, card_number
FROM CUSTOMERS
WHERE name = 'Smith, John'
``` would for a user for which the mask applied return the result:

| name | card_number |
| --- | --- |
| Smith, John | XXXX-XXXX-XXXX-3456 |

However, with this FGAC mechanism in place it is still possible for the user to determine the masked value, using queries crafted in an appropriate manner. For example, for the same user the query:

```
SELECT name
FROM CUSTOMERS
WHERE card_number like '1234-5678-9012-%'
```

(% being a wildcard in database languages such as SQL) would for the user for return the result:

| name |
| --- |
| Smith, John |

Thus, as the user is able to determine from the initial search that the last four digits of the card_number are 3456, this allows the user to confirm the entire card_number value even though they do not have authority to see it.

A user could in this way discover whole card_number values, using successive queries of the type above to test whether guesses for the initial twelve digits are correct. To further highlight the problem, a binary search could be performed using successive queries of the form:

```
SELECT name
FROM CUSTOMERS
WHERE name = 'Smith, John' AND card_number <
'5000-0000-0000-0000'
``` where in the case of a returned result the next query would be:

```
SELECT name
FROM CUSTOMERS
WHERE name = 'Smith, John' AND card_number <
'2500-0000-0000-0000'
``` and in the case of no returned result the next query would be:

```
SELECT name
FROM CUSTOMERS
WHERE name = 'Smith, John' AND card_number <
'7500-0000-0000-0000'
``` and so on. In this way, the initial twelve digits of the card_number value could be identified using at most $2 \cdot (\log_2 1,000,000,000)+1=59$ queries (and often fewer).

SUMMARY

In accordance with a first aspect of the invention there is provided a computer-implemented method and a computer program product for processing a database statement for a relational database, wherein the database comprises one or more tables comprising one or more data rows. A database statement is received. A set of predicates is determined from the database statement to be used to generate the result of the database statement. A set of data rows is determined from the one or more tables to be used to generate the result of the database statement. A set of interdiction statements applicable to one or more data rows of the set of data rows is obtained. For each predicate of the set of predicates, the following steps are performed: obtaining a set of masks applicable to one or more data rows of the set of data rows, wherein for each mask of the set of masks, the data masked by the mask is used by the predicate; determining whether a data row of the set of data rows has an applicable interdiction statement, and contains data masked by a mask of the set of masks; and in the case that a data row of the set of data rows has an applicable interdiction statement, and contains data masked by a mask of the set of masks, determining the result of the database statement without using the result of applying the predicate to the data row.

In accordance with a second aspect of the invention there is provided a database system that includes a database engine arranged to receive database statements from a client device and at least one database in communication with the database engine. The at least one database includes one or more database tables, and each table includes one or more data rows. The database engine is arranged, on receiving a database statement from the client device, to perform the method described above and return the determined result to the client device.

In accordance with a third aspect of the invention there is provided a computer program product for processing a database statement for a relational database. The database includes one or more tables having one or more data rows. The computer program product includes a computer-readable storage medium having computer-readable program code embodied therewith. The computer-readable program code configured to provide a database system that includes a database engine and at least one database in communication with the database engine. The database engine is arranged to receive database statements from a client device. The at least one database includes one or more database tables. Each table includes one or more data rows. The database engine is arranged, on receiving a database statement from the client device, to: determine a set of predicates from the database statement to use to generate the result of the database statement; determine a set of data rows from the one or more tables to use to generate the result of the database statement; obtain a set of interdiction statements applicable to one or more data rows of the set of data rows; for each predicate of the set of predicates: obtain a set of masks applicable to one or more data rows of the set of data rows, wherein for each mask of the set of masks, the data masked by the mask is used by the predicate; determine if a data row of the set of data rows has an applicable interdiction statement, and contains data masked by a mask of the set of masks; and in the case that a data row of the set of data rows has an applicable interdiction statement, and contains data masked by a mask of the set of masks, determine the result of the database statement without using the result of applying the predicate to the data row; and return the determined result to the client device.

It will of course be appreciated that features described in relation to one aspect of the present invention may be incorporated into other aspects of the present invention. For example, the method of the invention may incorporate any of the features described with reference to the computer system of the invention and vice versa.

BRIEF DESCRIPTION OF THE SEVERAL VIEWS OF THE DRAWINGS

Preferred embodiments of the present invention will now be described, by way of example only, with reference to the following drawings in which.

DETAILED DESCRIPTION

Figure 1:
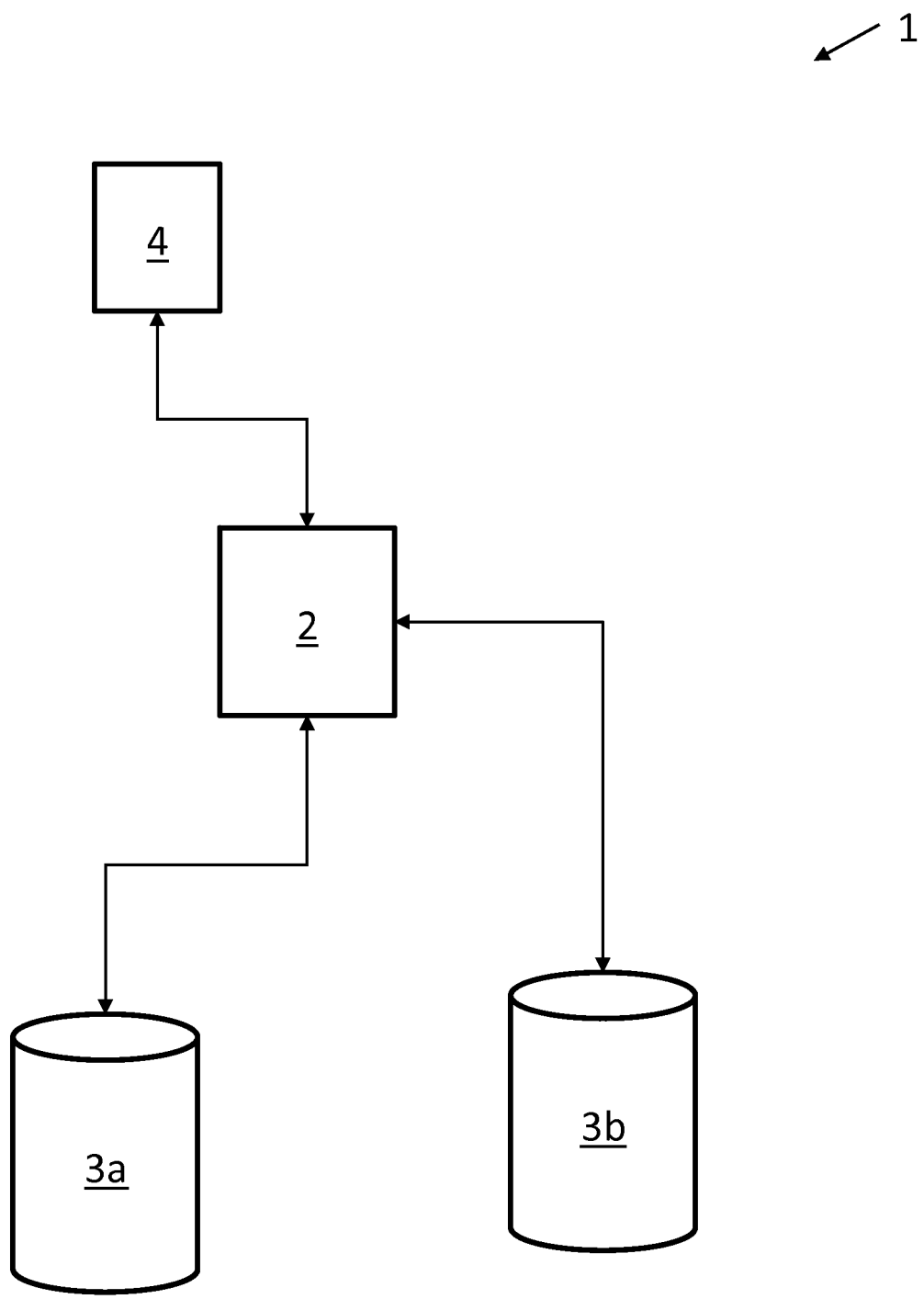
FIG. 1 is a schematic diagram of a database system in accordance with an embodiment of the invention.

As described above, in accordance with a first aspect of the invention there is provided a computer-implemented method and a computer program product for processing a database statement for a relational database. When determining the result of a database statement in accordance with this method, the predicates it uses (i.e. the predicates it contains that are evaluated when determining the result) and the data rows it uses (i.e. the rows from the underlying database tables which are combined and to which the predicates are applies) are determined. A set of masks and a set of interdiction statements will have been defined previously, for example by a database administrator, to restrict the information a user should be able to obtain from the database. If there is an interdiction statement that applies to a data row, and if the data row is masked, and the masked data is used by a predicate of the database statement, the result of the database statement is determined without using the result of applying the predicate to the data row. In this way, information about masked data that could be inferred from the result of applying the predicate to the data row is not available from the result of the database statement, even if the masked data itself would not have otherwise been provided as part of those results. It will be appreciated that when used in the above, and throughout the application, a "set" of items may consist of only a single item, and does not need to consist of two or more items.

The result of the database statement may be determined without using the result of applying the predicate to the data row, by: removing the data row from the set of data rows; and applying the set of predicates to the modified set of data rows. By removing a data row when there is an applicable interdiction statement and it contains masked data, when the predicate is used to determine the result of the database statement, the masked data is not available to affect the result of the predicate, and so will not affect the result of the database statement as a whole. As a result, it will not be possible for any information about the masked data to be inferred from the result of the database statement.

Alternatively, the result of the database statement the determined without using the result of applying the predicate to the data row, by removing the predicate from the set of predicates and applying the modified set of predicates to the set of data rows. By removing a predicate from the set of predicates when there is an applicable interdiction statement and it contains masked data, when the result of the database statement is determined it will not depend upon the masked data, as the predicate which used that masked data (i.e. the result of which depended upon the masked data) has been removed from the set of predicates used to determine the result of the database statement. As a result, in this alternative it will again not be possible for any information about the masked data to be inferred from the result of the database statement.

Advantageously, each interdiction statement of the set of interdiction statement defines whether the result of the database statement is determined without using the result of applying the predicate to the data row, by removing the data row from the set of data rows or removing the predicate from the set of predicates. This allows both the above methods to be used for a single database statement, with the interdiction statement defining which method is used for a particular case.

Preferably, each interdiction statement of the set of interdiction statement defines the type of database statements to which it applies. For example, each interdiction statement may state that it applies to SELECT, INSERT, UPDATE and/or DELETE database statements, or that it applies to all types of database statement. In this way, fine-grained control of the database statements to which interdiction statements apply can be achieved. In this case, preferably the set of interdiction statements includes only interdiction statements applicable to the database statement. This helps ensure that only applicable interdiction statements are used when processing a database statement.

One or more interdiction statements of the set of interdiction statements may define a column of a table to which it applies. This allows interdictions to be applied to only particular columns of a table. In this case, in the step of determining if a data row of the set of data rows has an applicable interdiction statement, and contains data masked by a mask of the set of masks, an interdiction statement is determined to be applicable only if it applies to a column of a table, the data of which is masked by the mask. Alternatively and/or additionally, one or more of the interdiction statements may define an entire table to which it applies, and in that case will be determined to be applicable if the data of any column of the table is masked.

Referring now to the figures, a database system in accordance with an embodiment of the invention is shown in FIG. 1. The database system 1 comprises a database engine 2, which is in communication with databases 3a and 3b. A client device 4 is in communication with the database engine 2, to allow a user of the client device 4 to send queries, data updates and the like to the database engine 2. The database engine 2 uses the databases 3a and 3b as appropriate to answer queries and return the results to the client device 4, apply updates to the data in the databases 3a and 3b, and any appropriate other tasks required by the client device 4.

In the present embodiment the database system is an SQL-type relational database system, but it will be appreciated that in alternative embodiments a relational database that is not of SQL-type, or a database that is not a relational database, may be used.

To communicate with the database engine 2, the client device 4 provides user credentials to the database engine 2 that identify the user. As described below, the database engine 2 can use the identity of the user when determining how to respond to statements sent from the client device 4 to the database engine 2, for example which results to return in response to a query.

In accordance with the embodiment of the invention, users can create data combination interdictions, using interdiction statements that are applied to a database, and in particular to one or more tables or views of a database. It will be appreciated that ordinarily, a data combination interdiction will be created by an administrator, to control the data to which "ordinary" users have access.

Such a statement defines a user should be able to access, and is of the form:

```
CREATE INTERDICTION <interdiction name>
TO STATEMENTS (<statement types>)
ON <column/table names>
FOR <authorization names>
EXCEPT <authorization name exceptions>
```

<interdiction name> defines a name for the data combination interdiction being created, which should be unique in the database system 1.

<statement types> defines the type of the statements to be interdicted, which is a list of one or more of the following values:
SELECT—SELECT access is interdicted;
INSERT—INSERT access is interdicted;
UPDATE—UPDATE access is interdicted;
DELETE—DELETE access is interdicted;
ALL—all database statement types are interdicted; this is equivalent to choosing all of SELECT, INSERT, UPDATE and DELETE.

<table/column names> defines the column or table names to which the data combination interdiction applies, with a table name implying the data combination interdiction applies to all columns of that table.

<authorization names> defines the users for which the data combination interdiction applies, with <authorization name exceptions> defining any exceptions. Both may include one or more authorization IDs, and may include users, group, roles or PUBLIC.

It will be appreciated that this is merely an example of a syntax that might be used, and in other embodiments of the invention other syntaxes could be used, or indeed data combination interdictions could be without using databases statements at all, for example via application menu options/settings.

Figure 2:
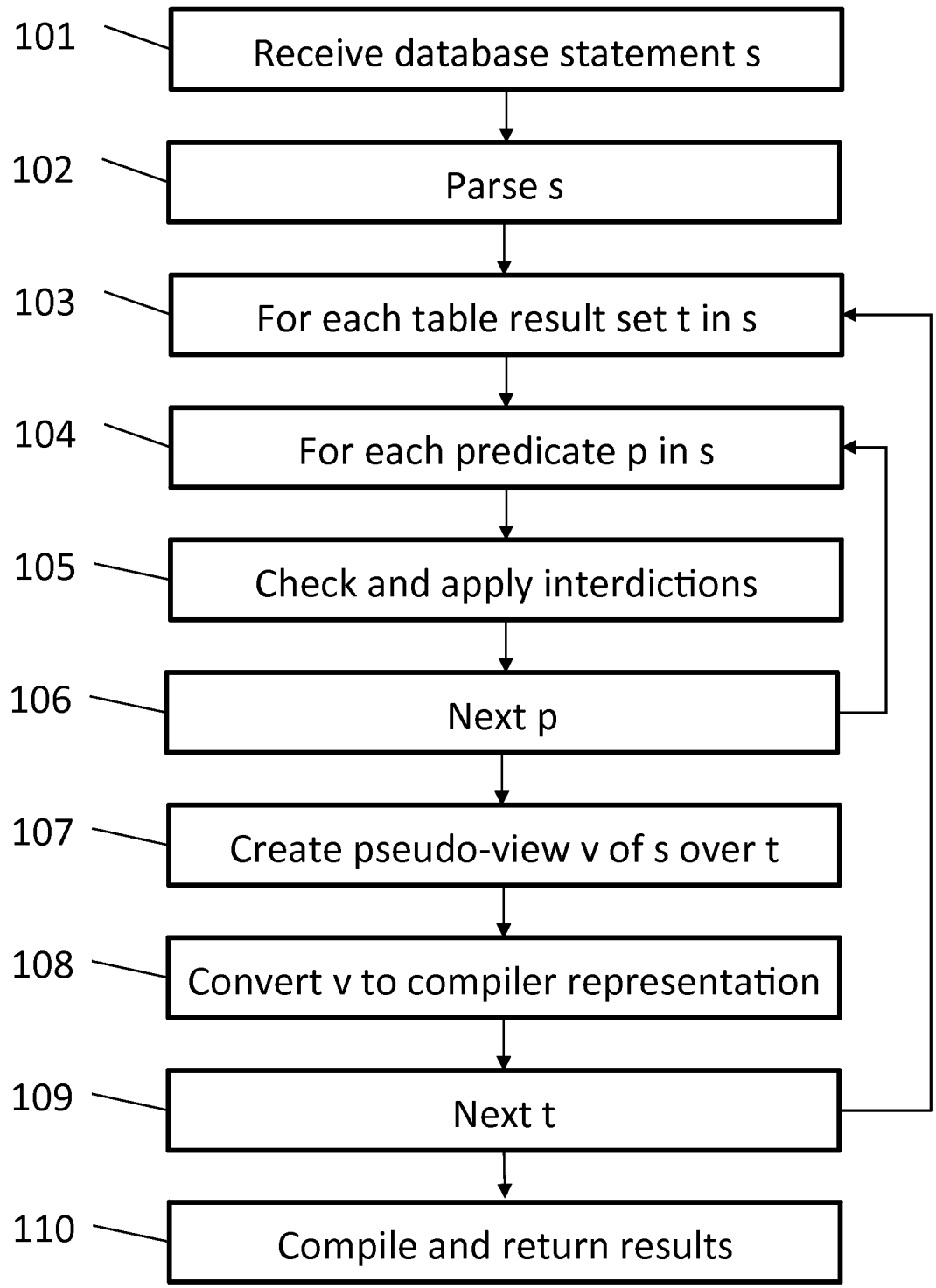
FIG. 2 is a flowchart showing the high-level operation of a database system in accordance with an embodiment of the invention when processing a database statement.

The high-level operation of the database system 1 when processing a database statement, in particular a database statement for which a data combination interdiction is relevant, is now described with reference to the flowchart of FIG. 2.

Initially, the database engine 2 receives a statement s, for example a SELECT query, from the client device 4 (step 101). The statement s will of course be made by a particular user, with the database engine 2 being aware of the particular user who has submitted the statement s from the user credentials they use when connecting to the database engine 2.

The database engine 2 parses the statement s (step 102), and evaluates the parsed components of the statement s in the usual way to obtain a set of table result sets, i.e. sets of rows from the underlying tables that are used to generate the result of the statement s. In conventional operation of a database engine, these table result sets would be combined as defined by the statement s to produce the result of the statement s.

However, in accordance with the present embodiment, the database engine 2 performs the following processing of the table result sets before the result of the statement s is produced. For each table result set t (step 103), each predicate p in s is considered (step 104). (A predicate is an expression in a statement that evaluates to true or false (or "unknown"), for example a condition of a WHERE clause that needs to be true for a result to be returned.)

The database engine 2 checks if any data combination interdictions are relevant and applies them (step 105), as described in more detail below. (Which data combination interdictions are relevant will of course depend upon the user who submitted the statement as well as the content of the statement s, as discussed below.) The next predicate p in s is then considered (step 106), until all predicates p in s have been considered.

The database engine 2 then creates a pseudo-view v of s over t (step 107), which is a modified version of the table result set t, obtained by the process of applying any relevant data combination interdictions. The pseudo-view v is converted to a compiler representation (step 108), in the same way that the original table result set t would be converted to a compiler representation by a conventional database engine.

The next table result set is then considered (step 109), until all table result sets for the statement s have been considered. The compiled pseudo-views v corresponding to the table result sets t for the statement s are then compiled and returned to the client device 4 (step 110), in the usual way. In other words, before generating the result of the statement s from its table result sets, the table result sets are first processed to give the corresponding pseudo-views, and the result of the statement s is produced from the pseudo-views.

It will be appreciated that where the statement s is an INSERT, UPDATE or DELETE statement, the relevant data in the database 3a and/or 3b will be updated as appropriate as part of the compilation, as well as the appropriate set of results in compiled form being returned to the client device 4.

Figure 3:
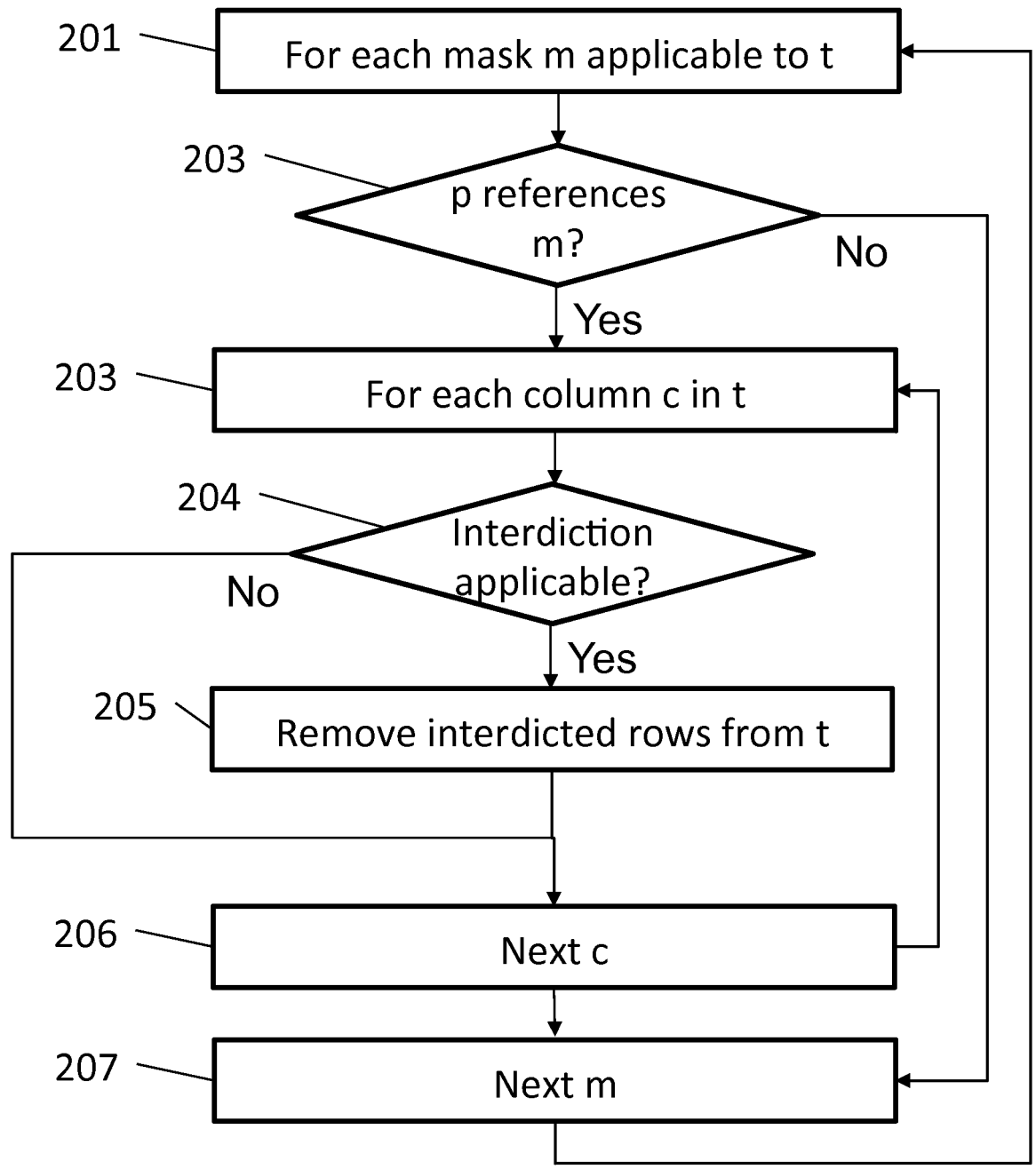
FIG. 3 is a flowchart showing the operation of the database system of FIG. 2 when applying a data combination interdiction.

The step of checking and applying any relevant data combination interdictions to a table result set t (step 105) is now described in more detail, with reference to the flowchart of FIG. 3. As described above, the step is applied for each predicate p of the statement s, for each table result set t.

The database engine 2 considers each mask m that is applicable to the table result set t (step 201). The applicable masks are any that act upon a column of the table result set t, in other words that mask the value of the table column. The database engine 2 then checks if the predicate p references the mask m (step 203), in other words if the predicate p uses the value of the table column masked by the mask m. If it does not, the next applicable mask m is considered (step 209).

On the other hand, if the predicate p does uses the value of the table column masked by the mask m, the database engine 2 then considers each column c in the table result set t (step 203), and determines whether there is a data combination interdiction for a statement of the same type as s that is applicable to the column c (step 204), i.e. if there is a data combination interdiction definition with STATEMENTS clause that covers the type of statement s, and that mentions the column in its ON part. If not, the next column c of the table result set t is considered (step 206). However, if there is an applicable data combination interdiction, then the interdicted rows are removed from the table result set t (step 205), i.e. the rows of the table result set t that satisfy the predicate p. The next column c of the table result set t is considered (step 207).

Once all columns of the table result set t have been considered, as above the next mask is considered (step 207), and once all masks have been considered, the step of applying all relevant data combination interdictions to the table result set t for the predicate p has been completed. As described above, the process is then repeated for the other predicates p used in the statement s, until all predicates s have been completed and the resulting processed. The modified table result set t obtained from this process is then used to create the pseudo-view v, and the pseudo-view are used to generate the result of the statement s, as described above.

It will be appreciated that where there are data combination interdictions which are applicable to a whole table rather than an individual column (i.e. for which the ON clause of the definition includes a table name), where such a data combination interdiction is identified when checking the first column of the table result set, it does not need to be checked again for the other columns of the table result set, as any future processing of the same data combination interdiction on the same table result set will have no effect, so is redundant. Thus the process may be optimised by keeping a record of data combination interdiction that refers to whole tables.

An example of the operation of the database engine 2 of the present embodiment is as follows. In the example, a database table CUSTOMERS is created in the database 4a by the following table definition:

---
CREATE TABLE CUSTOMERS (
    name VARCHAR(128),
    card_number CHAR(19),
    exp_date DATE
    start_date DATE)
PROTECTED BY FGAC;
---

The following rows are instructed into the table:

---
INSERT INTO CUSTOMERS VALUES ('Smith, John, '1234-5678-9012-3456', '2020-01-01', '2010-01-01);
INSERT INTO CUSTOMERS VALUES ('Doe, Jane', '9876-5432-1098-7654', '2019-06-10', '2011-06-10');
INSERT INTO CUSTOMERS VALUES ('Bloggs, Joe', '1357-2468-9135-0246', '2018-12-25', '2009-03-04');
INSERT INTO CUSTOMERS VALUES ('Mustermann, Max', '6284-9681-2833-5503', '2025-04-04', '2014-10-11');
---

As will be appreciated, this results in a table CUSTOMERS having the same set of rows as used in the example of the background section above:

| Name | card_number | exp_date | start_date |
| --- | --- | --- | --- |
| Smith, John | 1234-5678-9012-3456 | 2020 Jan. 1 | 2010 Jan. 1 |
| Doe, Jane | 9876-5432-1098-7654 | 2019 Jun. 10 | 2011 Jun. 10 |
| Bloggs, Joe | 1357-2468-9135-0246 | 2018 Dec. 25 | 2009 Mar. 4 |
| Mustermann, Max | 6284-9681-2833-5503 | 2025 Apr. 4 | 2014 Oct. 11 |

A mask CUSTOMER_MASK is then defined on the column card_number of the table CUSTOMERS; as will be appreciated, this is similarly the mask used in the example of the background section above:

---
CREATE MASK CUSTOMER_MASK
ON CUSTOMER
FOR COLUMN card_number
RETURN 'XXXX-XXXX-XXXX-' & SUBSTR(card_number,15,4);
---

(The function SUBSTR(card_number,15,4) returns the four characters following the 15$^{th}$ character of the string given by card_number, i.e. the last four digits of the 16-digit card number.)

A role ACCOUNTING is created, privilege to use SELECT statements on the CUSTOMERS table is granted to the role ACCOUNTING, and a user Temp is granted privilege to the role ACCOUNTING:

```
CREATE ROLE ACCOUNTING;
GRANT SELECT ON CUSTOMER TO ROLE ACCOUNTING;
GRANT ROLE ACCOUNTING TO Temp
```

In this case, as discussed above, as User has SELECT privilege on the table CUSTOMERS by virtue of the role ACCOUNTING, the statement:
SELECT*FROM CUSTOMERS
will return for Temp the following results, i.e. the rows of the table CUSTOMERS with the mask CUSTOMER_MASK applied to the values in the card_number table:

| Name | card_number | exp_date | start_date |
|---|---|---|---|
| Smith, John | XXXX-XXXX-XXXX -3456 | 2020 Jan. 1 | 2010 Jan. 1 |
| Doe, Jane | XXXX-XXXX-XXXX -7654 | 2019 Jun. 10 | 2011 Jun. 10 |
| Bloggs, Joe | XXXX-XXXX-XXXX -0246 | 2018 Dec. 25 | 2009 Mar. 4 |
| Mustermann, Max | XXXX-XXXX-XXXX -5503 | 2025 Apr. 4 | 2014 Oct. 11 |

However, the statement:

```
SELECT name
FROM CUSTOMERS
WHERE card_number LIKE '1234-5678-9012-%'
``` will for Temp return the following result:

| Name |
|---|
| Smith, John | thus enabling Temp to confirm the full card_number value for Smith, John despite the existence of the mask CUSTOMER_MASK.

To prevent this, the following data combination interdiction is defined:

```
CREATE INTERDICTION CUSTOMER_INTERDICTION
TO STATEMENTS SELECT
ON CUSTOMERS
FOR ACCOUNTING;
```

The operation of the database engine 2 when processing the statement:

```
SELECT name
FROM CUSTOMERS
WHERE card_number LIKE '1234-5678-9012-%'
``` is now as follows. The statement is parsed (step 101), and its table result sets determined (step 102); in this case, the table result set is just the set of rows from the CUSTOMERS table:

| Name | card_number | exp_date | start_date |
|---|---|---|---|
| Smith, John | 1234-5678-9012-3456 | 2020 Jan. 1 | 2010 Jan. 1 |
| Doe, Jane | 9876-5432-1098-7654 | 2019 Jun. 10 | 2011 Jun. 10 |
| Bloggs, Joe | 1357-2468-9135-0246 | 2018 Dec. 25 | 2009 Mar. 4 |
| Mustermann, Max | 6284-9681-2833-5503 | 2025 Apr. 4 | 2014 Oct. 11 |

The database engine 2 then considers each predicate in the statement (step 104), which is (only) the predicate "card_number LIKE '1234-5678-9012-%'", again. The database engine 2 then checks and applies any data combination interdictions (step 105). To do this, the database engine 2 considers each mask applicable to the table result set (step 201), which is (only) the mask CUSTOMER_MASK. As the predicate "card_number LIKE '1234-5678-9012-%'" references the mask CUSTOMER_MASK (because it refers to the column card_number which is masked by CUSTOMER_MASK), the database engine 2 checks if any data combination interdiction is applicable (step 204). The CUSTOMER_INTERDICTION is determined to be applicable, as it covers SELECT statements, and applies to the CUSTOMERS table as a whole.

Because the CUSTOMER_INTERDICTION data combination interdiction is determined to be applicable, the rows that satisfy the predicate "card_number LIKE '1234-5678-9012-%'" are removed from the table result set (step 205), which is the single row for name Smith, John, leaving the following modified table result set:

| Name | card_number | exp_date | start_date |
|---|---|---|---|
| Doe, Jane | 9876-5432-1098-7654 | 2019 Jun. 10 | 2011 Jun. 10 |
| Bloggs, Joe | 1357-2468-9135-0246 | 2018 Dec. 25 | 2009 Mar. 4 |
| Mustermann, Max | 6284-9681-2833-5503 | 2025 Apr. 4 | 2014 Oct. 11 |

All predicates and table result sets have now been considered, and so the resulting modified table set is used as the pseudo-view for the table result set (step 107), and converted to compiler representation (step 108). Then, when the compiler representation is compiled and returned (step 110), the effect of this is that the set of rows from the pseudo-view:

| Name | card_number | exp_date | start_date |
|---|---|---|---|
| Doe, Jane | 9876-5432-1098-7654 | 2019 Jun. 10 | 2011 Jun. 10 |
| Bloggs, Joe | 1357-2468-9135-0246 | 2018 Dec. 25 | 2009 Mar. 4 |
| Mustermann, Max | 6284-9681-2833-5503 | 2025 Apr. 4 | 2014 Oct. 11 | that satisfy the "card_number LIKE '1234-5678-9012-%'" are returned, which will of course be none of them (as any satisfying the predicate were removed as a result of the data combination interdiction). As a result, this results in an empty set of results being returned to Temp in response to the statement:

```
SELECT name
FROM CUSTOMERS
WHERE card_number LIKE '1234-5678-9012-%'
``` thus preventing Temp being able to confirm the value of card_number using this SELECT query.

In this way, information that should be protected is not revealed when the SELECT statement is processed. The database table contains a data row for "Smith, John", which has credit card number data "1234-5678-9012-3456" protected by known FGAC, i.e. the mask. (The table contains other similarly protected data rows, of course.) In addition, in accordance with the embodiment of the invention, the data combination interdiction is defined that applies to the data row and the credit card number data (as well as the other data rows in the table, and the other columns of the data rows). When the SELECT statement is processed, an overlap is detected for its WHERE predicate between the FGAC protection given by the mask and the data combination interdiction. In particular, the overlap means that the information "1234-5678-9012" supplied by the user as part of the WHERE predicate, when combined with the information "3456" in the database table, is capable of providing information about the entire credit card number for 'Smith, John', so causing a potential exposure of information via an inference attack. Because of the detected overlap, the result is modified so as to avoid the exposure of information, in particular in the present embodiment by removing the data row for which the overlap was detected.

Figure 4:
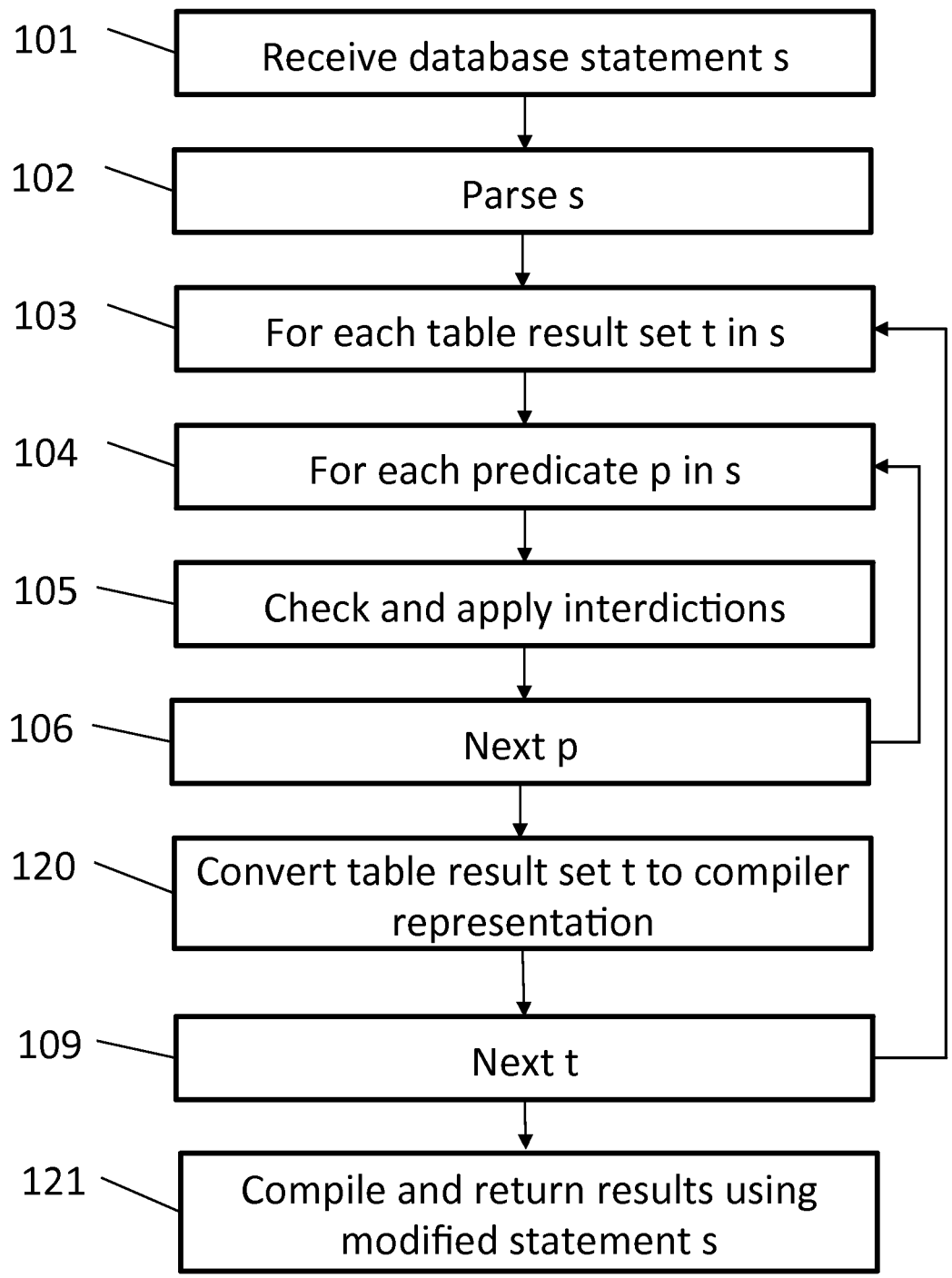
FIG. 4 is a flowchart showing the high-level operation of the database system in accordance with an alternative embodiment of the invention when processing a database statement.
Figure 5:
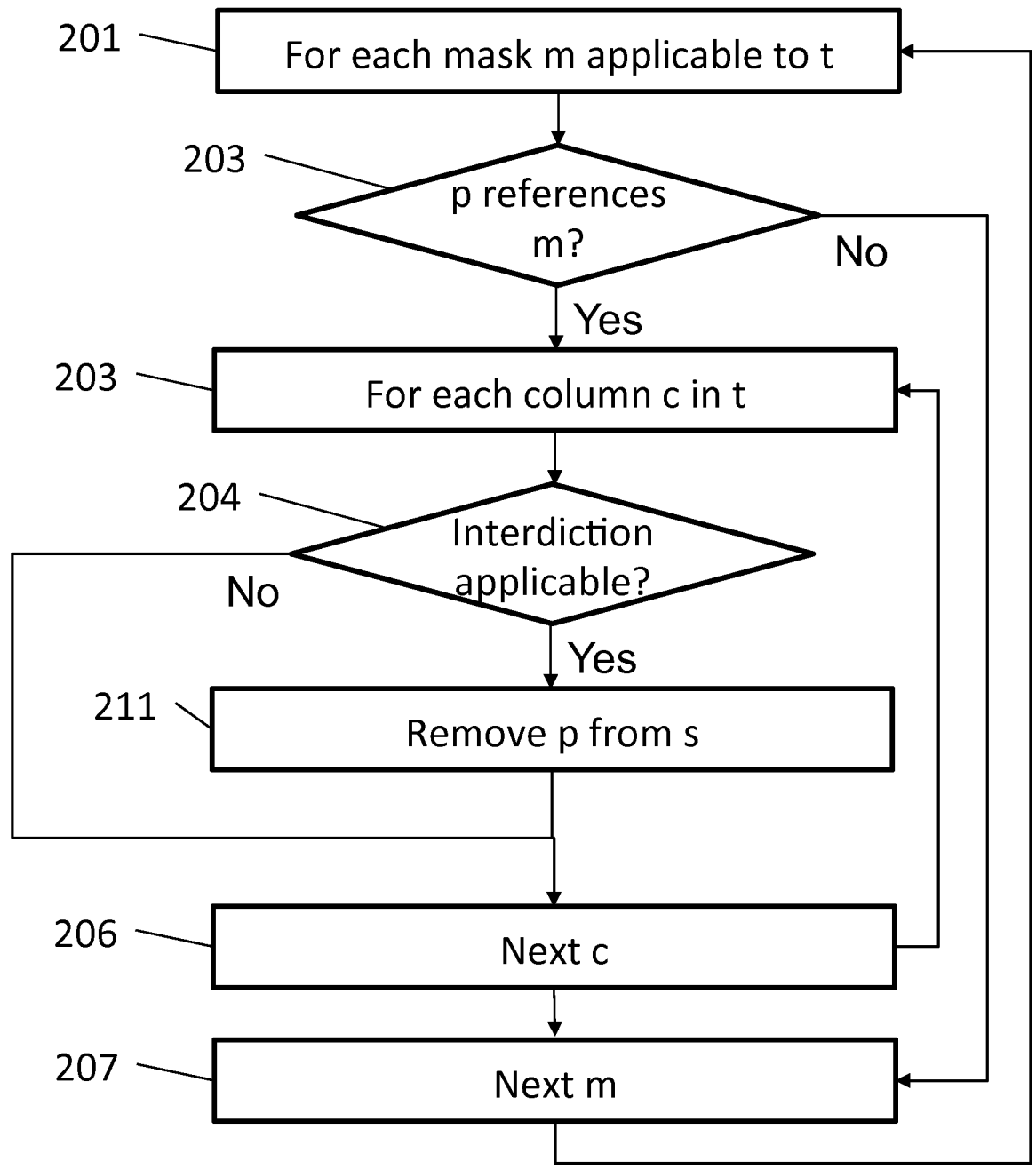
FIG. 5 is a flowchart showing the operation of the database system of FIG. 4 when apply a data combination interdiction.

The operation of the database engine 2 in accordance with another embodiment of the invention is now described, with reference to FIGS. 4 and 5. In this embodiment, the operation shown in FIG. 2 is again followed, but no pseudo-views are created and converted to compiler representations (steps 108 and 109 of FIG. 2). Instead, the original table result sets are converted to compiler representations (step 120 of FIG. 4), and are compiled to generate the returned results (step 121), as described in more detail below.

In addition, the step of checking and applying any relevant data combination interdictions to a table result set t (step 105) is as shown in FIG. 5. As shown in FIG. 5, the operation is similar to that of the embodiment above, expect for the behaviour undertaken when an application data combination interdiction is identified. In this case, rather than the rows of the table result set being removed (step 205 of FIG. 3), the predicate p is removed from the statement s (step 211), and the table result sets are not changed.

Thus, in the present embodiment, the table result sets that are used to generate the result of the statement are not changed. However, in the step of compiling and returning the results of the statement, the compiled table result sets are combined in accordance with the modified statement s, i.e. the statement s in which predicates have been removed where a data combination interdiction was found to be relevant.

The operation of the database engine 2 of this alternative embodiment on the example given above is now described. The statement being considered is:

```
SELECT name
FROM CUSTOMERS
WHERE card_number LIKE '1234-5678-9012-%'
```

In this example, when the CUSTOMER_INTERDICTION data combination interdiction is determined to be applicable to the table result set (i.e. the rows of the CUSTOMERS table), and to be referred to by the predicate "card_number LIKE '1234-5678-9012-%'", rather than removing any rows from the table result set, instead the predicate is removed from the statement, to give:

```
SELECT name
FROM CUSTOMERS
WHERE true
```

(It will be appreciated that instead, the entire WHERE clause could be removed, and that in statements with multiple predicates in combination, the predicate could be removed entirely rather than being replaced by "true".)

Then, when the compiler representation of the table result set is used to compile and return the result of the statement (new step 121), this is done using the modified statement above. As can be seen, this will result in the following results being returned:

| Name | card_number | exp_date | start_date |
|---|---|---|---|
| Smith, John | XXXX-XXXX-XXXX -3456 | 2020 Jan. 1 | 2010 Jan. 1 |
| Doe, Jane | XXXX-XXXX-XXXX -7654 | 2019 Jun. 10 | 2011 Jun. 10 |
| Bloggs, Joe | XXXX-XXXX-XXXX -0246 | 2018 Dec. 25 | 2009 Mar. 4 |
| Mustermann, Max | XXXX-XXXX-XXXX -5503 | 2025 Apr. 4 | 2014 Oct. 11 | i.e. all rows of the table CUSTOMERS (but with the mask CUSTOMER_MASK applied). In this way, again Temp is unable to confirm the value of card_number for Smith, John, but in this case because the predicate being used for the confirmation is ignored.

Figure 6:
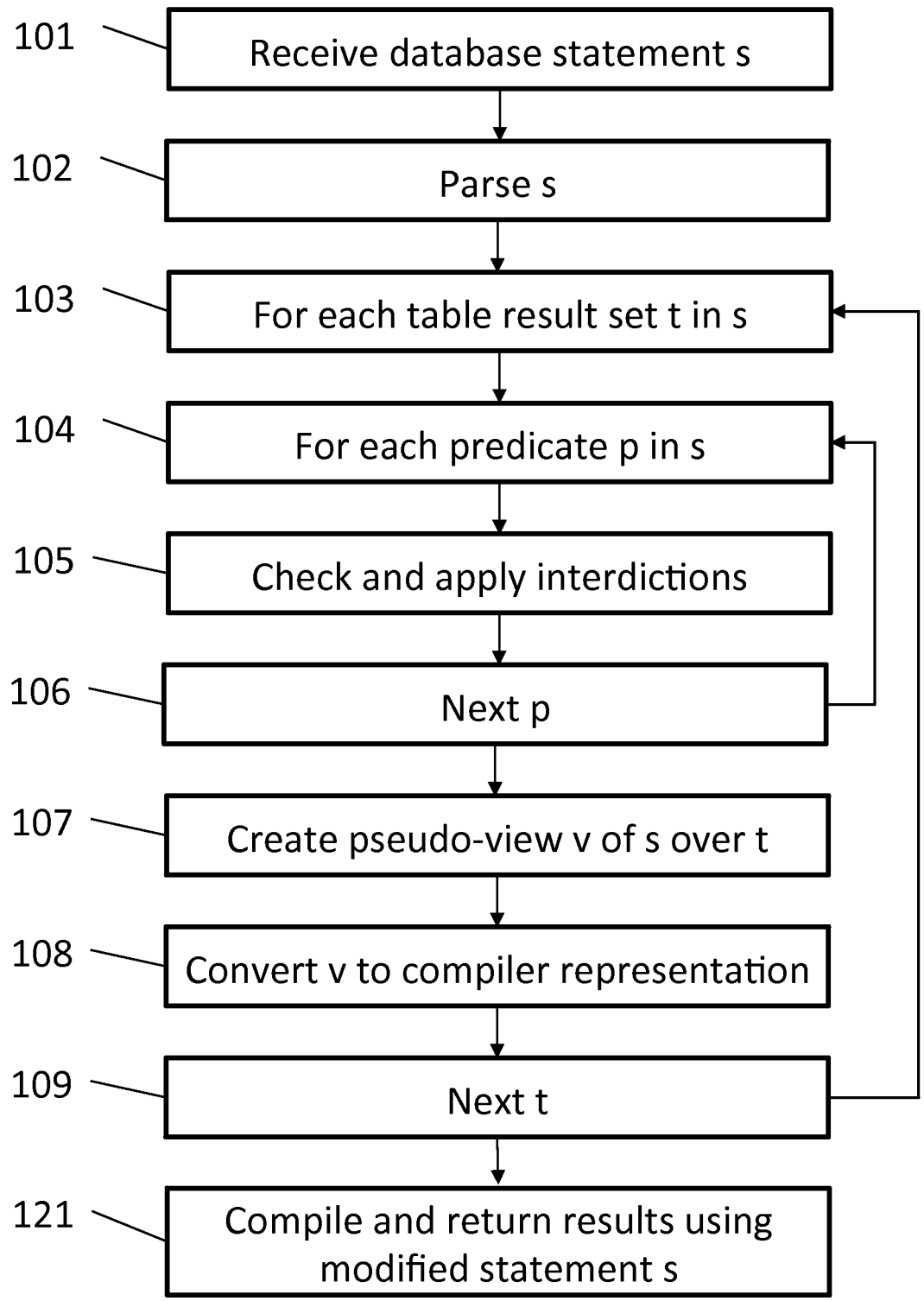
FIG. 6 is a flowchart showing the high-level operation of a database system in accordance with another alternative embodiment of the invention when processing a database statement.
Figure 7:
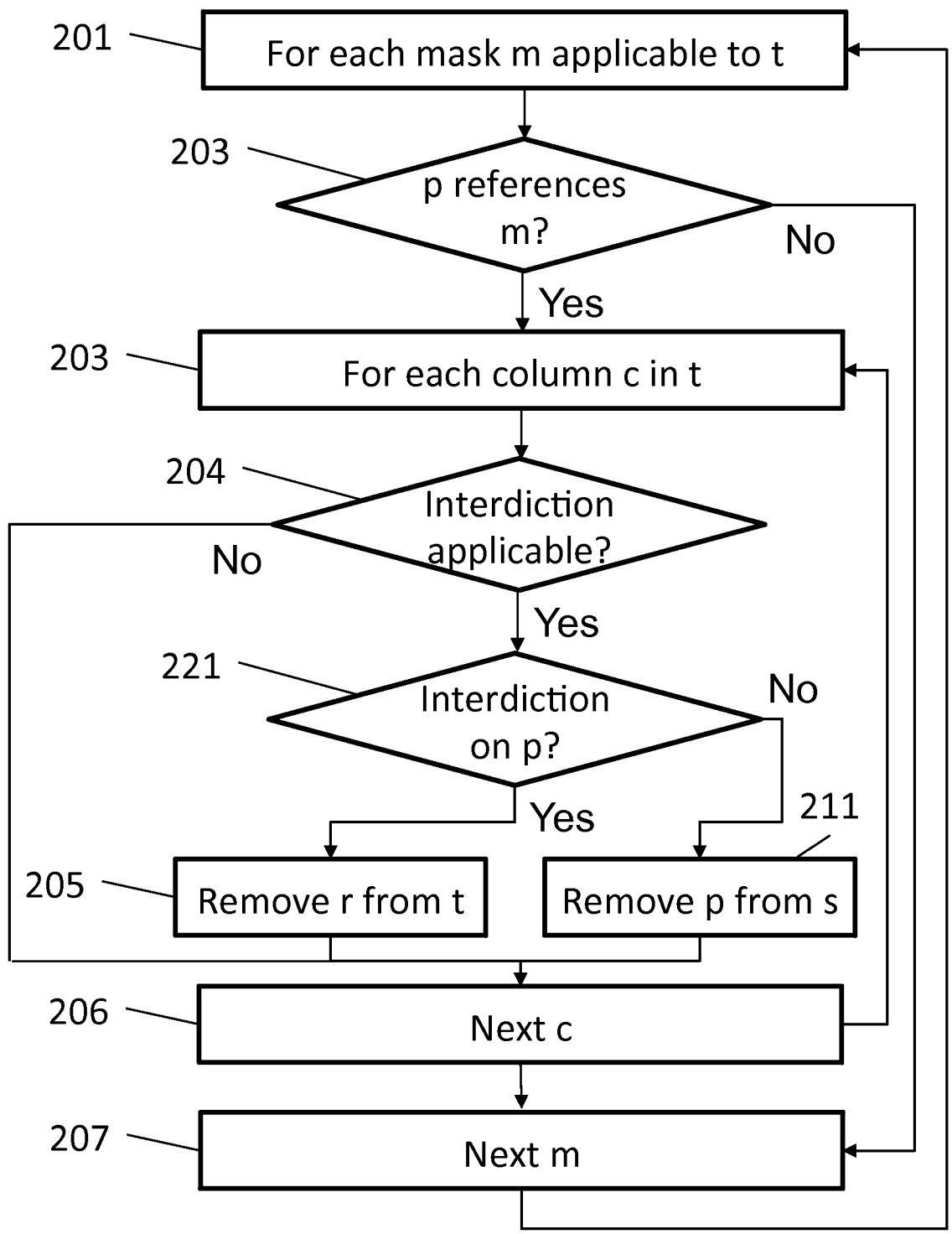
FIG. 7 is a flowchart showing the operation of the database system of FIG. 6 when apply a data combination interdiction.

The operation of the database engine 2 in accordance with still another embodiment of the invention is now described, with reference to FIGS. 6 and 7. In this embodiment, data combination interdiction definitions of the following form can be used:

```
CREATE INTERDICTION <interdiction name>
TO STATEMENTS (<statement types>)
INTERDICTING <interdicted condition>
ON <column/table names>
FOR <authorization names>
EXCEPT <authorization name exceptions>
```

As can be seen, in definitions of this type an INTERDICTING clause allows an <interdicting condition> to given, which defines the behaviour of the data combination interdiction when data access needs to be restricted. The <interdicting condition> is one of the following values:

VALUE—when data access needs to be restricted, the relevant value is omitted;

PREDICATE—when data access needs to be restricted, the relevant predicate is omitted.

Thus, VALUE corresponds to the behaviour of the first embodiment given above, while PREDICATE corresponds to the behaviour of the alternative embodiment. The overall operation of the database engine 2 is then a combination of that of the previous embodiment. In particular, as shown in FIG. 6, when data combination interdictions are applied, as this may result in rows being removed from the table result sets, pseudo-views are created (step 107) and converted to compiler representations (step 108). However, predicates may also be removed from the statement being processed, and so the compiler representations are compiled and retuned using the modified statement (step 121).

Then, in the step of checking and applying any relevant data combination interdictions to a table result set t (step 105) shown in FIG. 7, when a data combination interdiction is found to be applicable (step 204), the database engine 2 determines if the interdiction is on the predicate p or on the row values (step 221); in other words, if the INTERDICTING clause of the data combination interdiction is VALUE or PREDICATE. In the former case, the rows of the table result set that satisfy the predicate are removed from the table result set, as described above with reference to the first embodiment. In the latter case, the predicate is removed from the statement, as described above with reference to the alternative embodiment.

In this way, the behaviours of both the above embodiments can be exhibited by the present embodiment. In particular, considering again the example given above, where the data combination interdiction is defined as:

```
CREATE INTERDICTION CUSTOMER_INTERDICTION
TO STATEMENTS SELECT
INTERDICTING VALUE
ON CUSTOMERS
FOR ACCOUNTING;
``` the behaviour will be as in the first embodiment, whereas where the data combination interdiction is defined as:

```
CREATE INTERDICTION CUSTOMER_INTERDICTION
TO STATEMENTS SELECT
INTERDICTING PREDICATE
ON CUSTOMERS
FOR ACCOUNTING;
``` the behaviour will be as in the alternative embodiment.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing a database statement for a relational database, wherein the database comprises one or more tables, each table comprising one or more columns and one or more data rows, the method comprising the steps of:
    receiving a database statement;
    determining a set of predicates from the database statement to use to generate the result of the database statement;
    determining a set of data rows from the one or more tables to use to generate the result of the database statement;
    obtaining a set of interdiction statements, wherein each interdiction statement defines one or more types of database statements to which the interdiction statement applies and defines at least one column of a database table to which the interdiction statement applies, and wherein at least one interdiction statement in the set of interdiction statements defines fewer than all types of database statements;
    for each predicate of the set of predicates:
        obtaining a set of masks applicable to one or more data rows of the set of data rows, wherein for each mask of the set of masks, at least a portion of the data used by the predicate is masked;
        determining whether a data row of the set of data rows has an applicable interdiction statement, by examining whether the data row contains a column and a type of database statement that are both defined in one of the interdiction statements in the set of interdiction statements;
        determining whether the data row contains data masked by a mask of the set of masks; and
        in the case that the data row has an applicable interdiction statement, and contains data masked by a mask of the set of masks, determining the result of the database statement without using the result of applying the predicate to the data row.

2. A computer-implemented method as claimed in claim 1, wherein the result of the database statement is determined without using the result of applying the predicate to the data row, by:
    removing the data row from the set of data rows; and
    applying the set of predicates to the modified set of data rows.

3. A computer-implemented method as claimed in claim 1, wherein the result of the database statement is determined without using the result of applying the predicate to the data row, by:
    removing the predicate from the set of predicates; and
    applying the modified set of predicates to the set of data rows.

4. A computer-implemented method as claimed in claim 1, wherein each interdiction statement of the set of interdiction statement defines whether the result of the database statement is determined without using the result of applying the predicate to the data row, by performing one of:
    removing the data row from the set of data rows; and
    removing the predicate from the set of predicates.

5. A computer-implemented method as claimed in claim 1, wherein in the step of determining whether a data row of the set of data rows has an applicable interdiction statement, and contains data masked by a mask of the set of masks, an interdiction statement is determined to be applicable only if the interdiction statement applies to a column of a table, the data of which is masked by the mask.

6. A database system comprising:
    a database engine comprising a processor and a memory, wherein the database engine is arranged to receive database statements from a client device;
    at least one database in communication with the database engine, the at least one database comprising one or more database tables, each table comprising one or more data rows;
    wherein the processor and memory in the database engine are arranged, on receiving a database statement from the client device, to:
        determine a set of predicates from the database statement to use to generate the result of the database statement;
        determine a set of data rows from the one or more tables to use to generate the result of the database statement;

obtain a set of interdiction statements, wherein each interdiction statement defines one or more types of database statements to which the interdiction statement applies and defines at least one column of a database table to which the interdiction statement applies, and wherein at least one interdiction statement in the set of interdiction statements defines fewer than all types of database statements;

for each predicate of the set of predicates:
obtain a set of masks applicable to one or more data rows of the set of data rows, wherein for each mask of the set of masks, at least a portion of the data used by the predicate is masked;
determine whether a data row of the set of data rows has an applicable interdiction statement, by examining whether the data row contains a column and a type of database statement that are both defined in one of the interdiction statements in the set of interdiction statements;
determine whether the data row contains data masked by a mask of the set of masks; and
in the case that the data has an applicable interdiction statement, and contains data masked by a mask of the set of masks, determine the result of the database statement without using the result of applying the predicate to the data row; and return the determined result to the client device.

7. A database system as claimed in claim 6, wherein the processor and memory in the database engine are arranged to determine the result of the database statement without using the result of applying the predicate to the data row, by:
removing the data row from the set of data rows; and
applying the set of predicates to the modified set of data rows.

8. A database system as claimed in claim 6, wherein the processor and memory in the database engine are arranged to determine the result of the database statement without using the result of applying the predicate to the data row, by:
removing the predicate from the set of predicates; and
applying the modified set of predicates to the set of data rows.

9. A database system as claimed in claim 6, wherein each interdiction statement of the set of interdiction statement defines whether the result of the database statement is determined without using the result of applying the predicate to the data row, by performing one of:
removing the data row from the set of data rows; and
removing the predicate from the set of predicates.

10. A database system as claimed in claim 6, wherein the processor and memory in the database engine are arranged, when determining whether a data row of the set of data rows has an applicable interdiction statement, and contains data masked by a mask of the set of masks, to determine that an interdiction statement is applicable only if the interdiction statement applies to a column of a table, the data of which is masked by the mask.

11. A computer program product for processing a database statement for a relational database, wherein the database comprises one or more tables, each table comprising one or more data rows, the computer program product comprising a computer-readable storage medium having computer-readable program code embodied therewith, the computer-readable program code configured to perform the steps of:
receiving a database statement;
determining a set of predicates from the database statement to use to generate the result of the database statement;
determining a set of data rows from the one or more tables to use to generate the result of the database statement;
obtaining a set of interdiction statements, wherein each interdiction statement defines one or more types of database statements to which the interdiction statement applies and defines at least one column of a database table to which the interdiction statement applies, and wherein at least one interdiction statement in the set of interdiction statements defines fewer than all types of database statements;

for each predicate of the set of predicates:
obtaining a set of masks applicable to one or more data rows of the set of data rows, wherein for each mask of the set of masks, at least a portion of the data used by the predicate is masked;
determining whether a data row of the set of data rows has an applicable interdiction statement, by examining whether the data row contains a column and a type of database statement that are both defined in one of the interdiction statements in the set of interdiction statements;
determining whether the data row contains data masked by a mask of the set of masks; and
in the case that the data row has an applicable interdiction statement, and contains data masked by a mask of the set of masks, determining the result of the database statement without using the result of applying the predicate to the data row.

12. A computer program product as claimed in claim 11, wherein the result of the database statement is determined without using the result of applying the predicate to the data row, by:
removing the data row from the set of data rows; and
applying the set of predicates to the modified set of data rows.

13. A computer program product as claimed in claim 11, wherein the result of the database statement is determined without using the result of applying the predicate to the data row, by:
removing the predicate from the set of predicates; and
applying the modified set of predicates to the set of data rows.

14. A database system comprising:
a database engine arranged to receive database statements from a client device;
at least one database in communication with the database engine, the at least one database comprising one or more database tables, each table comprising one or more data rows;
wherein the database engine is arranged, on receiving a database statement from the client device, to:
determine a set of predicates from the database statement to use to generate the result of the database statement;
determine a set of data rows from the one or more tables to use to generate the result of the database statement;
obtain a set of interdiction statements, wherein each interdiction statement defines one or more types of database statements to which the interdiction statement applies and defines at least one column of a database table to which the interdiction statement applies, and wherein at least one interdiction statement in the set of interdiction statements defines fewer than all types of database statements;
for each predicate of the set of predicates:
obtain a set of masks applicable to one or more data rows of the set of data rows, wherein for each mask of the set of masks, at least a portion of the data used by the predicate is masked;

determine whether a data row of the set of data rows has an applicable interdiction statement, by examining whether the data row contains a column and a type of database statement that are both defined in one of the interdiction statements in the set of interdiction statements;

determine whether the data row contains data masked by a mask of the set of masks; and in the case that the data row has an applicable interdiction statement, and contains data masked by a mask of the set of masks, determine the result of the database statement without using the result of applying the predicate to the data row; and return the determined result to the client device.

15. A database system as claimed in claim 14, wherein the result of the database statement is determined without using the result of applying the predicate to the data row, by:
removing the data row from the set of data rows; and
applying the set of predicates to the modified set of data rows.

16. A database system as claimed in claim 14, wherein the result of the database statement is determined without using the result of applying the predicate to the data row, by:
removing the predicate from the set of predicates; and
applying the modified set of predicates to the set of data rows.

* * * * *